United States Patent
Rudy et al.

(10) Patent No.: US 8,908,333 B1
(45) Date of Patent: Dec. 9, 2014

(54) SHIELD DESIGNED FOR MIDDLE SHIELDS IN A MULTIPLE SENSOR ARRAY

(71) Applicant: Western Digital (Fremont), LLC, Fremont, CA (US)

(72) Inventors: Steven C. Rudy, San Jose, CA (US); Shaoping Li, San Ramon, CA (US); Gerardo A. Bertero, Redwood City, CA (US); Michael L. Mallary, Sterling, MA (US); Donghong Li, Pleasanton, CA (US); Yingbo Zhang, San Ramon, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/045,022

(22) Filed: Oct. 3, 2013

Related U.S. Application Data

(60) Provisional application No. 61/865,572, filed on Aug. 13, 2013.

(51) Int. Cl.
 *G11B 5/33* (2006.01)
 *G11B 5/127* (2006.01)
 *G11B 5/115* (2006.01)

(52) U.S. Cl.
 CPC .................................. *G11B 5/115* (2013.01)
 USPC ........................................... 360/319

(58) Field of Classification Search
 CPC ..................................... G11B 5/3903
 USPC ............. 360/110–112, 313–322, 324–327.33
 See application file for complete search history.

(56) References Cited

U.S. PATENT DOCUMENTS

| | | | |
|---|---|---|---|
| 4,012,781 | A | 3/1977 | Lin |
| 5,229,901 | A | 7/1993 | Mallary |
| 5,270,892 | A | 12/1993 | Naberhuis |
| 5,309,305 | A | 5/1994 | Nepela et al. |
| 5,388,014 | A | 2/1995 | Brug et al. |
| 5,684,658 | A | 11/1997 | Shi et al. |
| 5,696,654 | A | 12/1997 | Gill et al. |
| 5,721,008 | A | 2/1998 | Huang et al. |
| 5,796,535 | A | 8/1998 | Tuttle et al. |
| 5,831,888 | A | 11/1998 | Glover |
| 5,963,400 | A | 10/1999 | Cates et al. |
| 6,071,007 | A | 6/2000 | Schaenzer et al. |
| 6,104,562 | A | 8/2000 | Ottesen et al. |
| 6,154,335 | A | 11/2000 | Smith et al. |
| 6,157,510 | A | 12/2000 | Schreck et al. |
| 6,191,925 | B1 | 2/2001 | Watson |
| 6,216,242 | B1 | 4/2001 | Schaenzer |
| 6,271,998 | B1 | 8/2001 | Coehoorn et al. |
| 6,311,551 | B1 | 11/2001 | Boutaghou |
| 6,362,528 | B2 | 3/2002 | Anand |

(Continued)

*Primary Examiner* — Joseph Feild
*Assistant Examiner* — Gustavo Polo

(57) ABSTRACT

A method and system provide a magnetic transducer having an air-bearing surface (ABS) and including first and second read sensors and a shield. The shield is in a down track direction from the first read sensor and between the first and second read sensors. The shield includes a first shield layer, a second shield layer and an insulating layer between the first and second shield layers. The first shield layer is between the first read sensor and the second shield layer. The second shield layer is between the first shield layer and the second read sensor. The first shield layer has a first footprint. The second shield layer has a second footprint. The second shield layer overlaps the first shield layer in the down track direction. The overlap is not more than fifty percent of the first footprint and not more than fifty percent of the second footprint.

27 Claims, 8 Drawing Sheets

(56) References Cited

U.S. PATENT DOCUMENTS

| | | |
|---|---|---|
| 6,449,131 B2 | 9/2002 | Guo et al. |
| 6,496,333 B1 | 12/2002 | Han et al. |
| 6,674,618 B2 | 1/2004 | Engel et al. |
| 6,842,312 B1 | 1/2005 | Alstrin et al. |
| 6,861,756 B2 | 3/2005 | Saito et al. |
| 6,888,253 B1 | 5/2005 | Rogers et al. |
| 7,106,549 B2 | 9/2006 | Asakura |
| 7,193,807 B1 | 3/2007 | Liikanen et al. |
| 7,259,927 B2 | 8/2007 | Harris |
| 7,271,970 B2 | 9/2007 | Tsuchiya |
| 7,315,072 B2 | 1/2008 | Watanabe |
| 7,372,168 B2 | 5/2008 | Wu et al. |
| 7,405,907 B2 | 7/2008 | Raastad |
| 7,408,730 B2 | 8/2008 | Yamagishi |
| 7,436,632 B2 | 10/2008 | Li et al. |
| 7,868,362 B2 | 1/2011 | Randazzo et al. |
| 8,139,301 B1 | 3/2012 | Li et al. |
| 8,208,228 B2 | 6/2012 | Maat et al. |
| 8,384,220 B2 | 2/2013 | Saito et al. |

SHIELD DESIGNED FOR MIDDLE SHIELDS IN A MULTIPLE SENSOR ARRAY

CROSS-REFERENCE TO RELATED APPLICATIONS

This application claims priority to provisional U.S. Patent Application Ser. No. 61/865,572, filed on Aug. 13, 2013, which is hereby incorporated by reference in its entirety.

BACKGROUND

FIGS. 1A-1B depicts an air-bearing surface (ABS) and plan views of a conventional read transducer 10. The conventional read transducer 10 includes shields 12 and 20, sensor 14 and magnetic bias structures 16. The read sensor is typically a giant magnetoresistive (GMR) sensor or tunneling magnetoresistive (TMR) sensor. The read sensor 14 includes an antiferromagnetic (AFM) layer, a pinned layer, a nonmagnetic spacer layer, and a free layer. Also shown is a capping layer. In addition, seed layer(s) may be used. The free layer has a magnetization sensitive to an external magnetic field. Thus, the free layer functions as a sensor layer for the magnetoresistive sensor 14. The magnetic bias structures 16 may be hard bias structures or soft bias structures. These magnetic bias structures are used to magnetically bias the sensor layer of the sensor 14. As can be seen in FIG. 1B, the shields 12 and 20 have substantially the same footprint and overlap.

Although the conventional magnetic recording transducer 10 functions, there are drawbacks. In particular, the conventional magnetic recording transducer 10 may not function adequately at higher recording densities. Two-dimensional magnetic recording (TDMR) technology may enable significantly higher recording densities. In TDMR, multiple read sensors are used. These sensors are longitudinally distributed along the cross track direction but are aligned in the down track direction. The central sensor reads the data from a track of interest, while the outer sensors sense the data in adjacent tracks in order to account for noise.

Although TDMR might be capable of higher recording densities, issues may be faced at skew. For example, in some recording applications, such as shingled recording, the skew angle changes. Near the outside diameter of the disk, the skew angle may be positive. Closer to the center of the disk (the inside diameter of the disk), the skew angle may be negative. Between the inside and outside diameters, the skew angle may be zero. For nonzero skew angle(s), some of the recording sensors may be moved so that they are misaligned with the track they are desired to sense. This is generally an issue for the outer read sensors. As a result, the transducer may not perform as desired for all skew angles. In addition, providing electrical connection to the sensors may be challenging. Accordingly, what is needed is a system and method for improving the performance of a magnetic recording read transducer, particular for TDMR.

DETAILED DESCRIPTION OF THE EXEMPLARY EMBODIMENTS

Figure 1A:
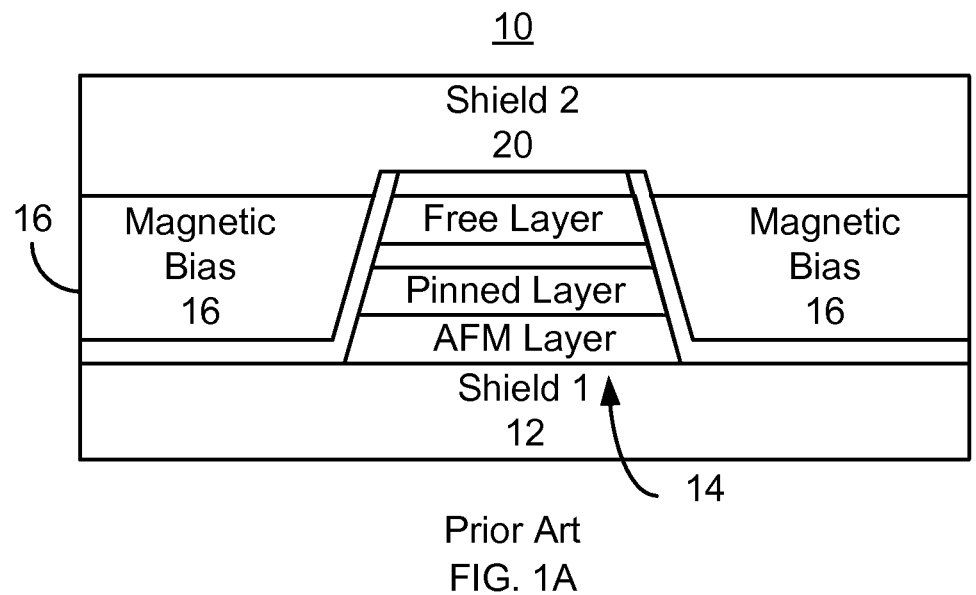
FIGS. 1A-1B depict a conventional read transducer.
Figure 1B:
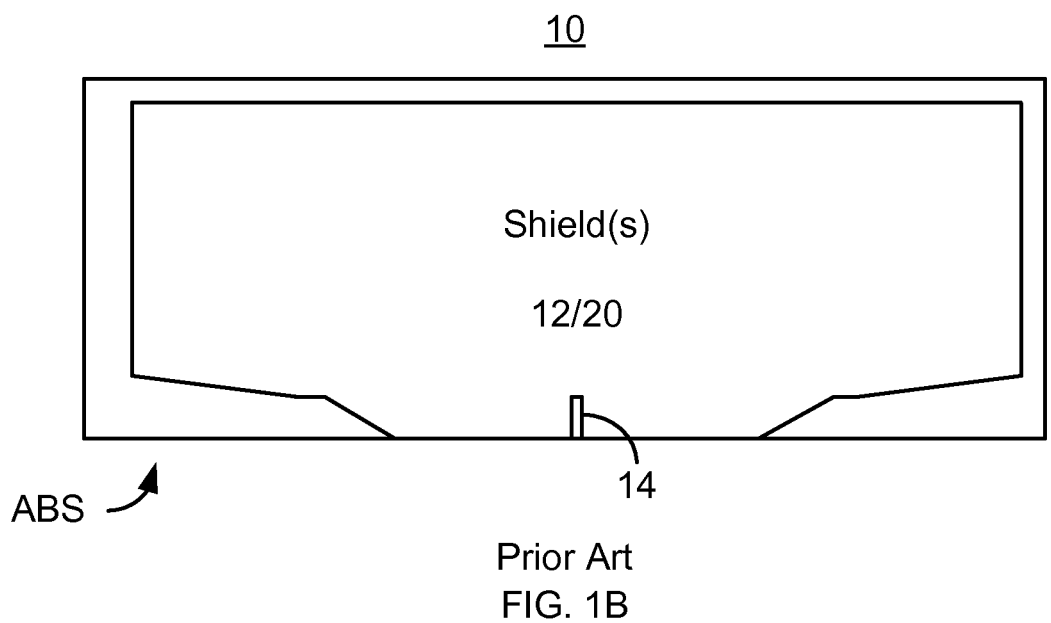
Figure 2:
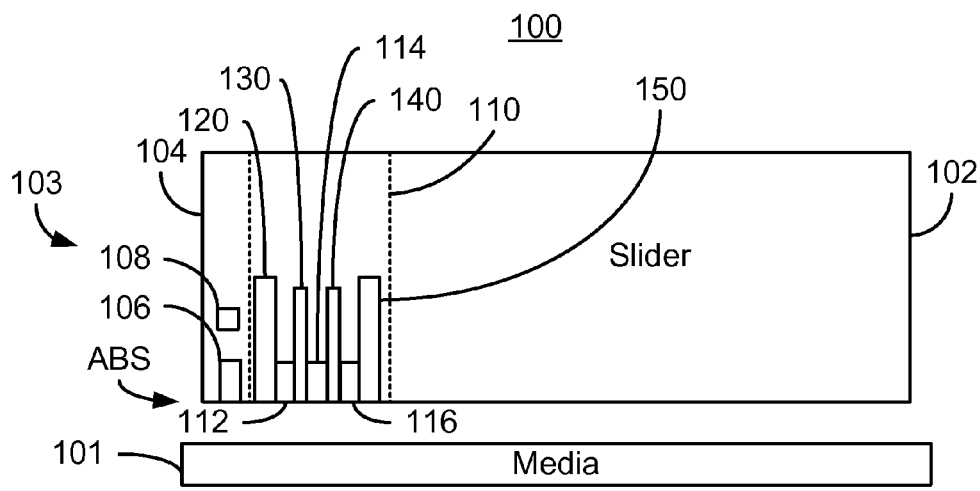
FIG. 2 depicts an exemplary embodiment of a disk drive.
Figure 3:
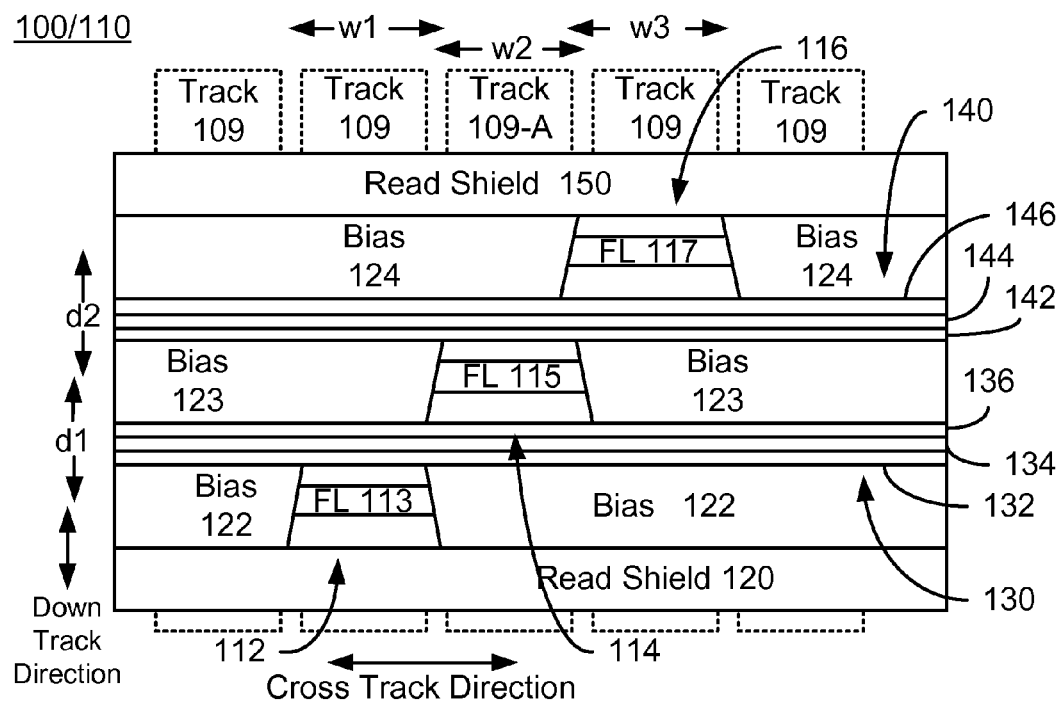
FIG. 3 depicts an ABS view exemplary embodiment of a portion of a magnetic recording read transducer.

FIG. 2-3 depict side and ABS views of a disk drive 100. For clarity, FIGS. 2 and 3 are not to scale. For simplicity not all portions of the disk drive 100 are shown. In addition, although the disk drive 100 is depicted in the context of particular components other and/or different components may be used. For example, circuitry used to drive and control various portions of the disk drive 100 is not shown. For simplicity, only single components are shown. However, multiples of one or more of the components and/or their sub-components might be used.

The disk drive 100 includes media 101, a slider 102, a head 103 including a write transducer 104 and a read transducer 110. The media 101 includes tracks 109. The write transducer includes at least a write pole 106 and coil(s) 108 for energizing the pole 106. Additional and/or different components may be included in the disk drive 100. Although not shown, the slider 102, and thus the transducers 104 and 110 are generally attached to a suspension (not shown). The transducers 104 and 110 are fabricated on the slider 102 and include an ABS proximate to the media 101 during use. Although both a write transducer 104 and a read transducer 110 are shown, in other embodiments, only a read transducer 110 may be present.

The read transducer 110 includes multiple read sensors 112, 114 and 116. The read sensors 112, 114 and 116 include sensor layers 113, 115 and 117, respectively, that may be free layers in a magnetoresistive junction such as a giant magnetoresistive (GMR) sensor, a tunneling magnetoresistive (TMR) sensor. Thus, each sensor 112, 114 and 116 may include a pinning layer, a pinned layer, a nonmagnetic spacer layer and a free layer 113, 115, and 117, respectively. For simplicity, only the free layers 113, 115 and 117 are separately labeled in FIG. 3. The sensors 112, 114 and 116 may also include seed layer(s) (not shown) and capping layer(s) (not shown). The pinning layer is generally an AFM layer that is magnetically coupled to the pinned layer. In other embodiments, however, the pinning layer may be omitted or may use a different pinning mechanism. The free layers 113, 115 and 117 are each shown as a single layer, but may include multiple layers including but not limited to a synthetic antiferromagnetic (SAF) structure. The pinned layer may also be a simple layer or a multilayer. Although shown as extending the same distance from the ABS, the pinned layer may extend further than the corresponding free layer 113, 115, and/or 117, respectively. The nonmagnetic spacer layer may be a conductive layer, a tunneling barrier layer, or other analogous layer.

Although depicted as a GMR or TMR sensor, in other embodiments, other structures and other sensing mechanisms may be used for the sensor.

The read sensors 112, 114 and 116 are separated by distances d1 and d2 in a down track direction. The down track direction is perpendicular to the cross track direction. The cross track direction and track width direction are the same. In the embodiment shown in FIGS. 2-4, the distance d1 and d2 between the sensors 112 and 114 and between the sensors 114 and 116, respectively, are the same. However, in other embodiments, the distances between the sensors 112, 114 and 116 may not be the same. It is generally desirable to reduce the distance between the sensors 112, 114 and 116 in order to reduce the skew effect. The distances d1 and d2 may each be at least ten nanometers and not more than four hundred nanometers. The read sensors 112, 114 and 116 may have multiple widths, w1, w2 and w3, respectively, in the track width, or cross-track, direction. However, in other embodiments, other widths are possible. The widths of the sensors 112, 114 and 116 may also be based on the track pitch. The track pitch is the distance from the center of one track to the center of the next track. Further, the widths may depend not only on the track pitch, but also on the distance between the sensors 112, 114 and 116.

The read sensors 112, 114 and 116 may also be displaced along the cross track direction. Therefore, the centers of each of the read sensors 112, 114 and 116 are not aligned along a vertical line that runs the down track direction. In the embodiment shown, none of the read sensors 112, 114 and 116 are aligned along a vertical line that runs in the down track direction. In other embodiments, some or all of the read sensors 112, 114 and 116 may be aligned. The read sensors 112, 114 and 116 may also partially overlap in the track width/cross track direction. However, in other embodiments, the read sensors 112, 114 and 116 may be aligned.

Also shown are bias structures 122, 123 and 124 that magnetically bias the read sensors 112, 114 and 116, respectively. The magnetic bias structure(s) 122, 123 and/or 124 may be soft bias structures fabricated with soft magnetic material(s). In other embodiments, the magnetic bias structure(s) 122, 123 and/or 124 may be hard magnetic bias structures. Other mechanisms for biasing the sensors 112, 114 and 116 might also be used.

The read sensors are separated by shields 130 and 140. The read sensors 112, 114 and 116 and shields 130 and 140 are surrounded by read shields 120 and 150. Thus, as used herein, a shield may be considered to be an internal shield, which is interleaved with read sensors 112, 114 and 116 and between the outer, read shields. The outermost shields for the read transducer 110 are termed read shields. In the embodiment shown in FIGS. 2-3, three read sensors 112, 114 and 116 and two internal shields 130 and 140 are shown. However, in another embodiment, another number of read sensors 112, 114 and 116 and internal shields 130 and 140 may be present. The shields/read shields 120, 130, 140 and 150 generally include soft magnetic material. In some embodiments, one or more of the shields 120, 130, 140 and 150 may include ferromagnetic layers that are antiferromagnetically coupled.

Current is driven perpendicular-to-plane for the sensors 112, 114 and 116. Thus, current is driven through the sensor 112 between the shields 120 and 130. Similarly, current is driven through the sensor 114 between the shields 130 and 140. Current is also driven through the sensor 116 between the shields 140 and 150. Thus, electrical connection is to be made to the shields 120, 130, 140 and 150. However, different currents may be desired to be driven through the sensors 112, 114 and 116. Similarly, the resistances of the sensors 112, 114 and 116 may be desired to be separately sensed. For example, the sensors 112, 114 and 116 may each be desired to be separately coupled to their own preamplifier (preamp). As a result, the sensors 112, 114 and 116 are desired to be electrically isolated from each other. Consequently, the shields 130 and 140 are configured to not only magnetically shield the sensors 112, 114 and 116, but also to provide electrical isolation. As a result, each shield 130 and 140 includes magnetic metallic layers separated by one or more insulating layers. Thus, the shield 130 includes conductive magnetic layers 132 and 136 that are separated by insulating layer 134. Similarly, the shield 140 includes conductive magnetic layers 142 and 146 separated by insulated layer 144.

Thus, the shields 130 and 140 may magnetically shield and electrically isolate the sensors 112, 114 and 116. However, without more, the capacitive coupling between the shield layers 132 and 136 and the shield layers 142 and 146 may adversely affect performance of the magnetic transducer 100. Consequently, the shield layers 132 and 136 are configured to have different footprints. More specifically, the footprints of the shield layers 132 and 136 overlap by not more than fifty percent of the footprint of each shield layer 132 and 136. In some embodiments, the overlap of the shield layers 132 and 136 is not more than twenty-five percent of the shield layers' footprints. In some such embodiments, the overlap is not more than twenty percent of the footprint of each shield layer. In other embodiments, the overlap is not more than fifteen percent of each shield layer 132 and 136. Similarly, the footprints of the shield layers 142 and 146 overlap by not more than fifty percent of the footprint of each shield layer 142 and 144. In some embodiments, the overlap of the shield layers 142 and 146 is not more than twenty-five percent of the shield layers' footprints. In some such embodiments, the overlap is not more than twenty percent of the footprint of each shield layer. In other embodiments, the overlap is not more than fifteen percent of each shield layer 142 and 146.

In addition to reducing the overlap, the shields 130 and 140 may also be configured so that the region near the sensors 112, 114 and 116 remains substantially unchanged with respect to conventional transducer(s). For example, corners of the shield layers 132, 136, 142 and/or 146 that are near the sensors 112, 114 and 116 may be rounded to reduce the concentration of magnetic fields. The shape anisotropies and magnetostriction of the shields 130 and/or 140 may also be configured to improve performance of the shields 130 and/or 140. For example, the long axis of the shields 130 and/or 140 may be aligned with the cross-track direction, providing a shape anisotropy and tensile stress for a positive magnetostriction.

The insulating layer(s) 134 and/or 144 may also be configured to improve the performance of the shields 130 and/or 140, respectively. For example, a low dielectric constant material may be used for the insulating layers 134 and/or 144. A low dielectric constant material is one which has a dielectric constant less than eight. For example, SiO and/or SiOC might be used for the insulating layer(s) 134 and/or 144. As a result, capacitive coupling between the shield layers 132 and 136 and/or the shield layers 142 and 146 may be reduced. The thickness of the insulating layer(s) 134 and/or 144 may be varied. More specifically, the thickness of the insulating layer(s) 134 and/or 144 may be increased distal from the sensors 112, 114 and 116. In some embodiments, the insulating layer 134 and 144 may be on the order of ten nanometers within five microns of the sensors 112, 114 and 116. Further from the sensors 112, 114 and 116, the thickness may be increased, for example to twenty nanometers. In addition, the material(s) may be changed further from the sensors 112, 114 and 116. For example, the insulating layer 134 may include a ten nanometer thick alumina sublayer having a dielectric constant of approximately six. At least five microns from the sensors an additional sublayer of silicon dioxide having a thickness of approximately ten nanometers with a dielectric constant of approximately three may be added. Thus, the insulating layer(s) 134 and/or 144 may have varying thicknesses and/or materials.

The read transducer 110 may be used in higher density recording, such as TDMR. Through the placement of the sensors 112, 114 and 116, the transducer 110 may address skew issues that might otherwise adversely affect performance of the transducer 110. Further, the reduction in overlap of the shield layers for the shields 130 and 140 may reduce the capacitive coupling between the shield layers 132 and 136 and the shield layers 142 and 146. The capacitive coupling may also be addressed by configuring the insulating layers 134 and/or 144 in the shields 130 and/or 140, respectively. Consequently, the impedance and response of the transducer 110 may be sufficient for higher frequency performance. Cross talk may thus be reduced. In addition, the effect on the magnetics and other aspects of the transducer 110 because of the reduced overlap may be mitigated by the configuration of the shields 130 and 140. Performance of the magnetic transducer 110 may thus be improved.

Figure 4A:
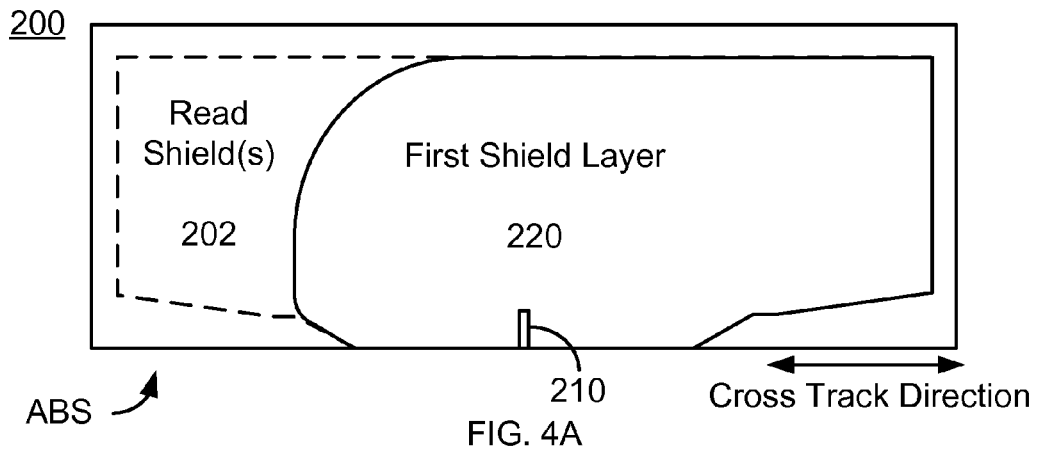
FIGS. 4A-4C depict plan views of the exemplary embodiment of a portion of a magnetic recording read transducer.
Figure 4B:
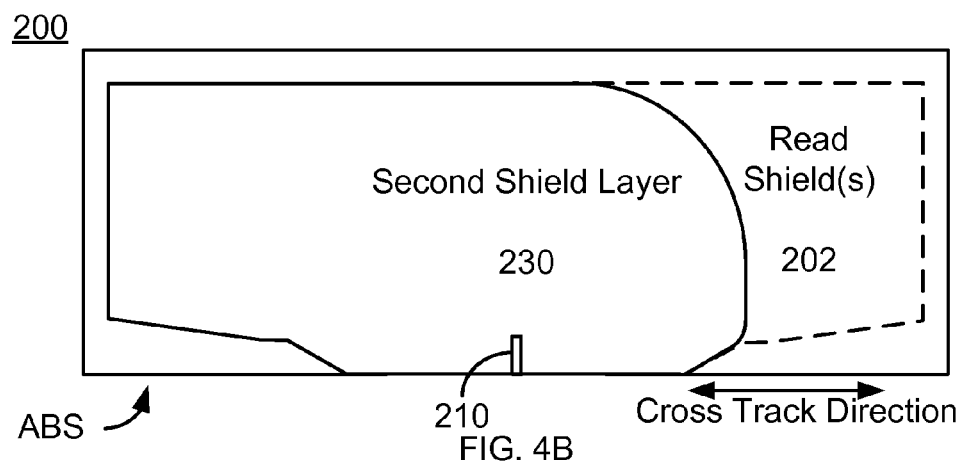
Figure 4C:
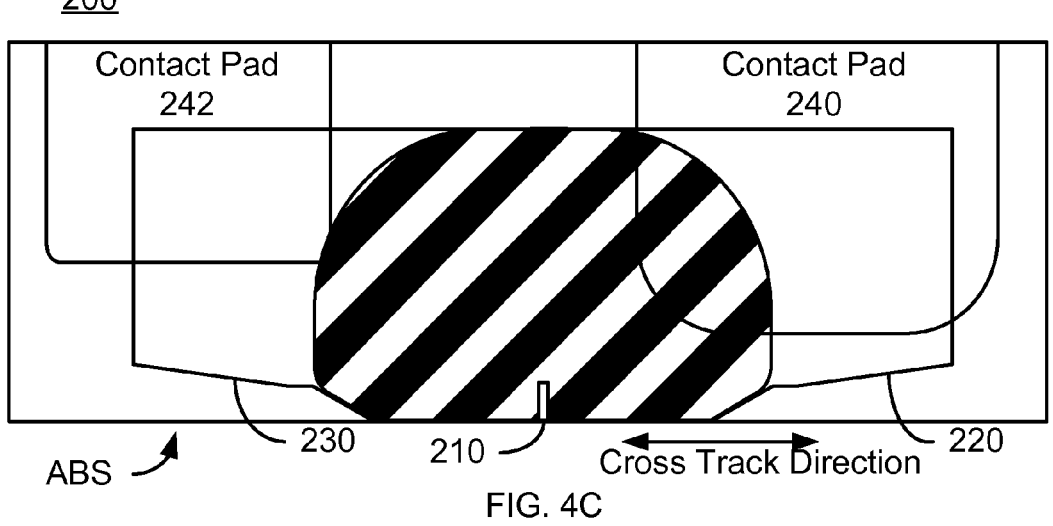

FIGS. 4A, 4B and 4C depict plan views of another exemplary embodiment of a portion of a magnetic recording read transducer 200. For clarity, FIGS. 4A, 4B and 4C are not to scale. For simplicity, only a portion of the read transducer 200 is shown. The read transducer 200 may be used in the disk drive 100 and is analogous to the read transducer 110. The read transducer 200 includes read sensor 210, first shield layer 220, second shield layer 230 and read shield(s) 202. The shield layers 220 and 230 may thus correspond to the shield layers 132 and 136 and/or the shield layers 142 and 146 depicted in FIG. 3. Although depicted as simple layers, the shield layer(s) 220 and/or 230 may be a multilayer. Such a multilayer may include but not be limited to antiferromagnetically coupled magnetic layers interleaved with nonmagnetic spacer layer(s). The read sensor 210 may correspond to the read sensor 112, 114, or 116. Also shown are contact pads 240 and 242 that are used to provide contact to the shield layer 220 and 230, respectively.

The shield layers 220 and 230 each have asymmetric footprints. The footprint of the shield layer 220 extends further in cross track direction on one side of the sensor 210. The footprint of the shield layer 230 extends further in the cross track direction on the opposite side of the sensor 210. Further, the footprints of the shield layers 220 and 230 are substantially mirror images of each other. In addition, portions of the shield layers 220 and 230 are curved to reduce the concentration of magnetic fields in these regions. Near the ABS the shield layers 220 and 230 are configured to substantially match the read shield 202. However in other embodiments, other configurations are possible.

As can be seen in FIG. 4C, the shield layers 220 and 230 overlap in the down track direction (out of the plane of the page). This overlap is shown as cross hatched in FIG. 4C. In some embodiments, this overlap is approximately fifty percent or less of the footprint of the shield layer 220 and approximately fifty percent or less of the footprint of the shield layer 230. Because the overlap has been reduced over what would be present if the footprints of the shield layers 220 and 230 were the same as that of the read shield 202, the capacitive coupling between the shield layers 220 and 230 may be reduced. The benefits of the read transducers 110 and 200 may thus be achieved while mitigating high frequency issues due to capacitive coupling between the shield layers 220 and 230. Cross talk may also be reduced. Consequently, performance of the transducer 200 and disk drive 100 may be improved.

Figure 5A:
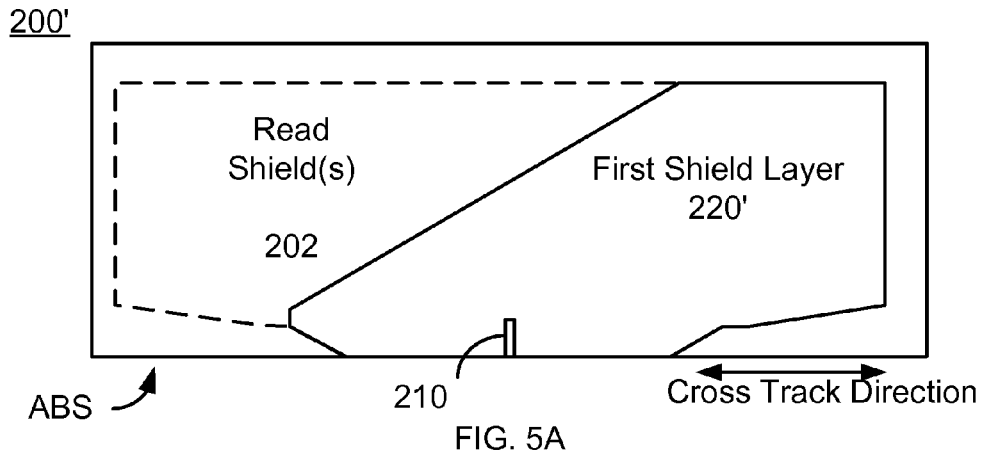
FIGS. 5A-5C depict plan views of another exemplary embodiment of a portion of a magnetic recording read transducer.
Figure 5B:
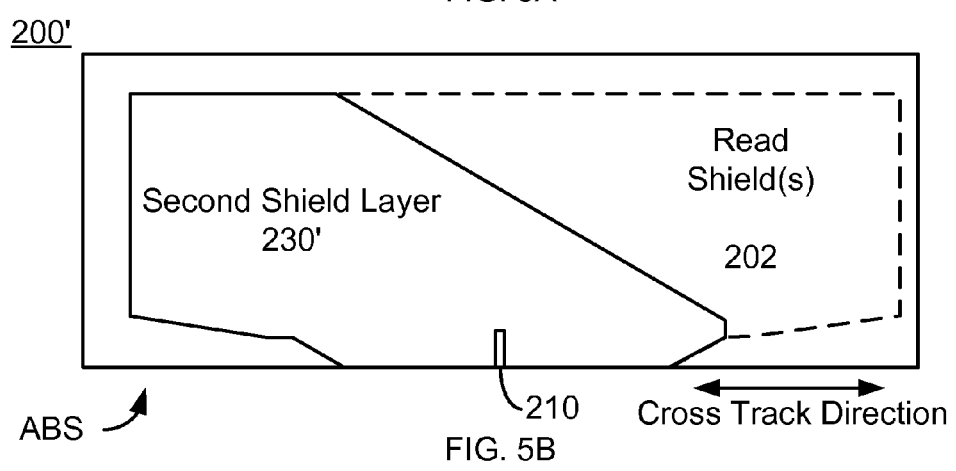
Figure 5C:
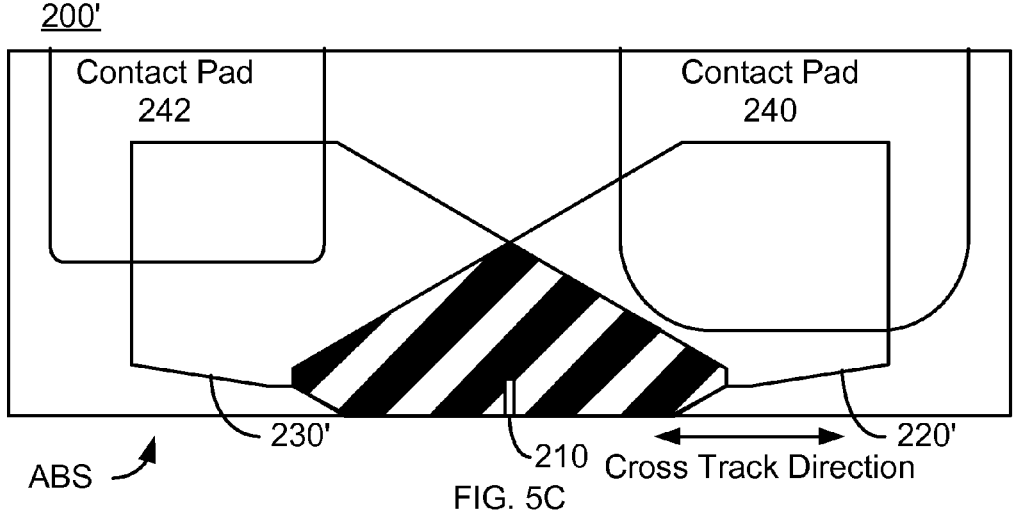

FIGS. 5A, 5B and 5C depict plan views of another exemplary embodiment of a portion of a magnetic recording read transducer 200'. For clarity, FIGS. 5A, 5B and 5C are not to scale. For simplicity, only a portion of the read transducer 200' is shown. The read transducer 200' may be used in the disk drive 100 and is analogous to the read transducers 110 and 200. The read transducer 200' includes read sensor 210, first shield layer 220', second shield layer 230' and read shield(s) 202 analogous to the read sensor 210, first shield layer 220, second shield layer 230 and read shield 202, respectively. The shield layers 220' and 230' may thus correspond to the shield layers 132 and 136, the shield layers 142 and 146 and/or the shield layers 220 and 230, respectively. Although depicted as simple layers, the shield layer(s) 220' and/or 230' may be multilayer(s). The multilayer(s) may include but be not limited to antiferromagnetically coupled magnetic layers interleaved with nonmagnetic spacer layer(s). The read sensor 210 may correspond to the read sensor 112, 114, or 116. Also shown are contact pads 240 and 242 that are used to provide contact to the shield layer 220' and 230', respectively.

The shield layers 220' and 230' each have asymmetric footprints. The footprint of the shield layer 220' extends further in cross track direction on one side of the sensor 210. The footprint of the shield layer 230' extends further in the cross track direction on the opposite side of the sensor 210. Further, the footprints of the shield layers 220' and 230' are substantially mirror images of each other. Near the ABS the shield layers 220' and 230' are configured to substantially match the read shield 202. However in other embodiments, other configurations are possible.

As can be seen in FIG. 5C, the shield layers 220' and 230' overlap in the down track direction. This overlap is shown as cross hatched in FIG. 5C. In some embodiments, this overlap is approximately twenty-five percent or less of the footprint of the shield layer 220' and approximately twenty-five percent or less of the footprint of the shield layer 230'. Because the overlap has been reduced over what would be present if the footprints of the shield layers 220' and 230' were the same as that of the read shield 202, the capacitive coupling between the shield layers 220' and 230' may be reduced. The benefits of the read transducers 110 and 200' may thus be achieved while mitigating high frequency issues due to capacitive coupling between the shield layers 220' and 230'. Cross talk may also be reduced. Consequently, performance of the transducer 200' and disk drive 100 may be improved.

Figure 6A:
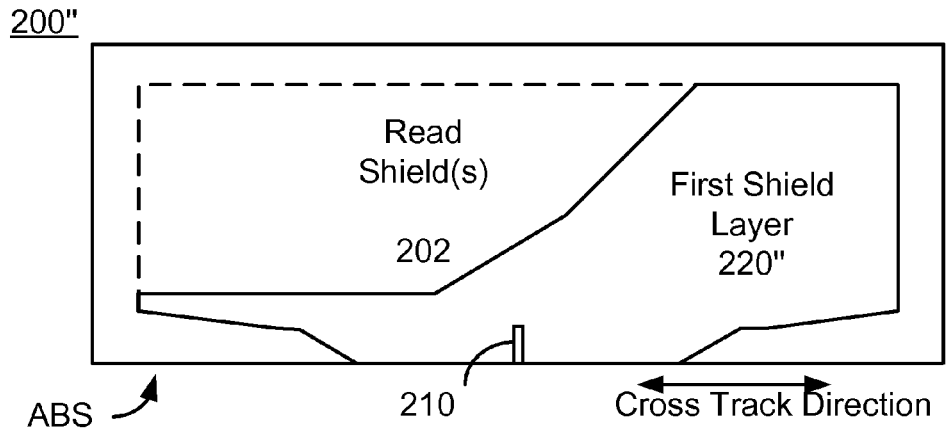
FIGS. 6A-6C depict plan views of another exemplary embodiment of a portion of a magnetic recording read transducer.
Figure 6B:
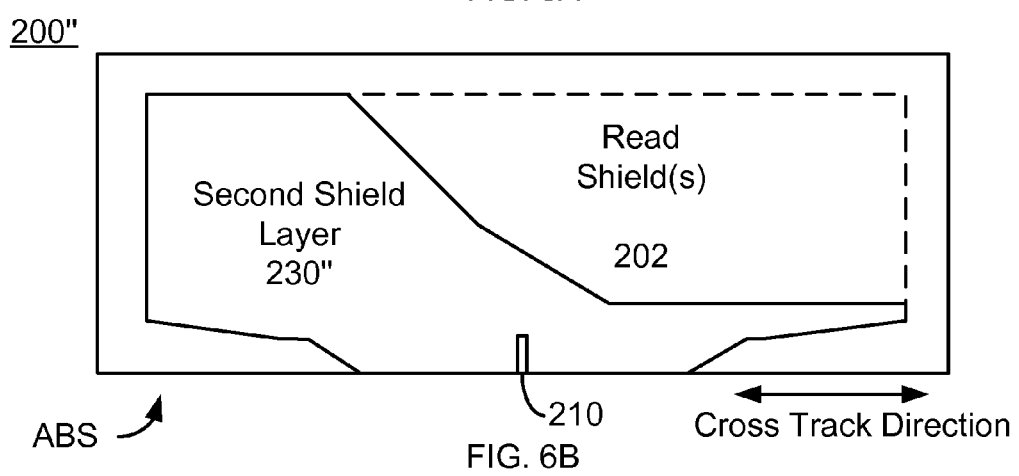
Figure 6C:
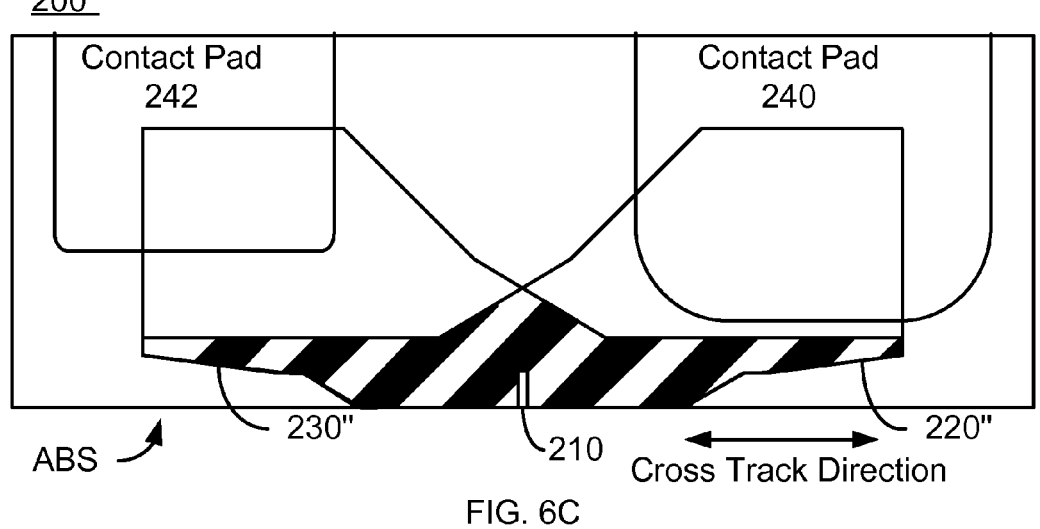

FIGS. 6A, 6B and 6C depict plan views of another exemplary embodiment of a portion of a magnetic recording read transducer 200". For clarity, FIGS. 6A, 6B and 6C are not to scale. For simplicity, only a portion of the read transducer 200" is shown. The read transducer 200" may be used in the disk drive 100 and is analogous to the read transducers 110, 200 and 200'. The read transducer 200" includes read sensor 210, first shield layer 220", second shield layer 230" and read shield(s) 202 analogous to the read sensor 210, first shield layer 220/220', second shield layer 230/230' and read shield 202, respectively. The shield layers 220" and 230" may thus correspond to the shield layers 132 and 136, the shield layers 142 and 146, the shield layers 220 and 230 and/or the shield layers 220' and 230', respectively. Although depicted as simple layers, the shield layer(s) 220" and/or 230" may be multilayer(s). The multilayer(s) may include but not be limited to antiferromagnetically coupled magnetic layers interleaved with nonmagnetic spacer layer(s). The read sensor 210 may correspond to the read sensor 112, 114, or 116. Also shown are contact pads 240 and 242 that are used to provide contact to the shield layer 220" and 230", respectively.

The shield layers 220" and 230" each have asymmetric footprints. The footprint of the shield layer 220" extends further in cross track direction on one side of the sensor 210. The footprint of the shield layer 230" extends further in the cross track direction on the opposite side of the sensor 210. Further, the footprints of the shield layers 220" and 230" are substantially mirror images of each other. Near the ABS the shield layers 220" and 230" are configured to substantially match the read shield 202. In addition, the profile of the shield layers 220" and 230" near the ABS have been lengthened. As a result, the shield layers 220" and 230" have a larger shape anisotropy near the ABS. However in other embodiments, other configurations are possible.

As can be seen in FIG. 6C, the shield layers 220" and 230" overlap in the down track direction. This overlap is shown as cross hatched in FIG. 6C. In some embodiments, this overlap is approximately twenty percent or less of the footprint of the shield layer 220" and approximately twenty percent or less of the footprint of the shield layer 230". Because the overlap has been reduced over what would be present if the footprints of the shield layers 220" and 230" were the same as that of the read shield 202, the capacitive coupling between the shield layers 220" and 230" may be reduced. In addition, because of the shape anisotropy of the shield layers 220" and 230", issues due to magnetostriction may be reduced or avoided. The benefits of the read transducers 110 and 200" may thus be achieved while mitigating high frequency issues due to capacitive coupling between the shield layers 220" and 230". Cross talk may also be reduced. Consequently, performance of the transducer 200" and disk drive 100 may be improved.

Figure 7A:
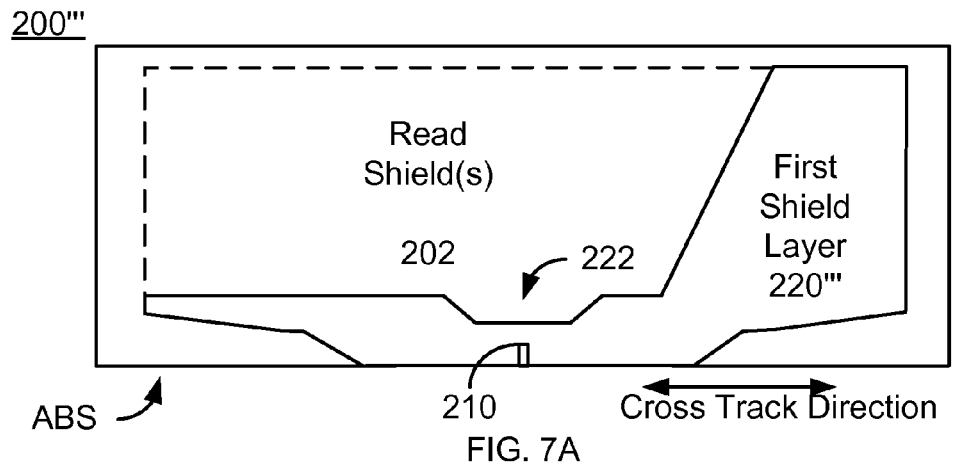
FIGS. 7A-7C depict plan views of another exemplary embodiment of a portion of a magnetic recording read transducer.
Figure 7B:
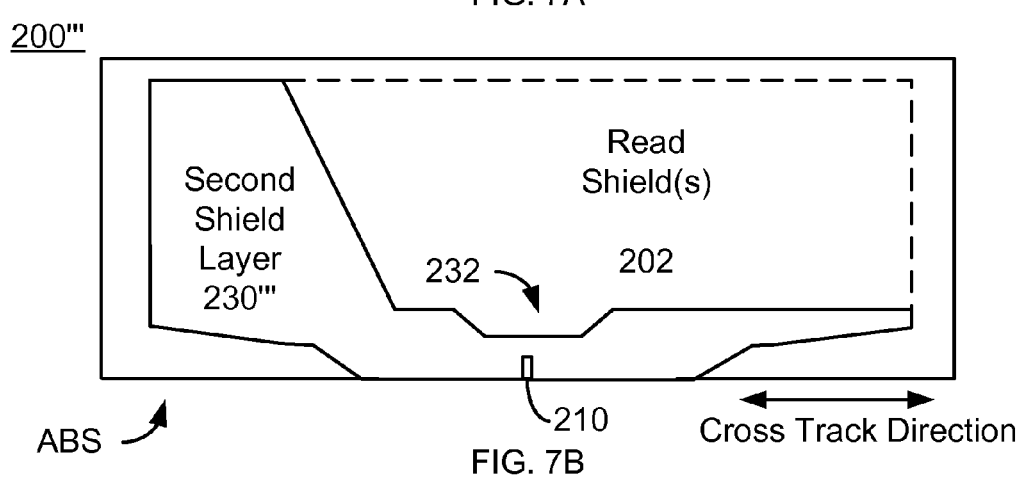
Figure 7C:
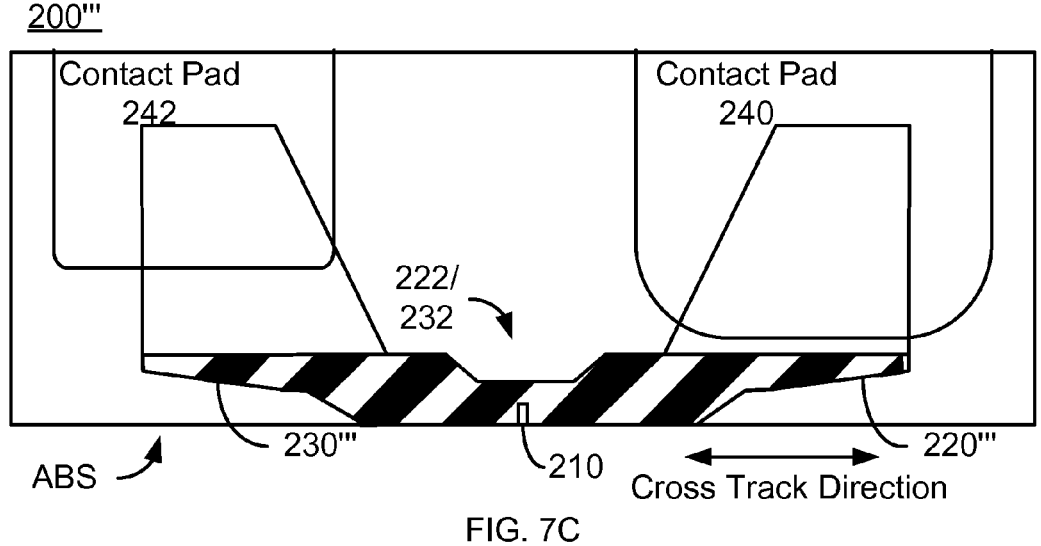

FIGS. 7A, 7B and 7C depict plan views of another exemplary embodiment of a portion of a magnetic recording read transducer 200'". For clarity, FIGS. 7A, 7B and 7C are not to scale. For simplicity, only a portion of the read transducer 200'" is shown. The read transducer 200'" may be used in the disk drive 100 and is analogous to the read transducers 110, 200, 200' and 200". The read transducer 200'" includes read sensor 210, first shield layer 220'", second shield layer 230'" and read shield(s) 202 analogous to the read sensor 210, first shield layer 220/220'/220", second shield layer 230/230'/230" and read shield 202, respectively. The shield layers 220'" and 230'" may thus correspond to the shield layers 132 and 136, the shield layers 142 and 146, the shield layers 220 and 230, the shield layers 220' and 230' and/or the shield layers 220" and 230", respectively. Although depicted as simple layers, the shield layer(s) 220'" and/or 230'" may be multilayer(s). The multilayer(s) may include but not be limited to antiferromagnetically coupled magnetic layers interleaved with nonmagnetic spacer layer(s). The read sensor 210 may correspond to the read sensor 112, 114, or 116. Also shown are contact pads 240 and 242 that are used to provide contact to the shield layer 220'" and 230'", respectively.

The shield layers 220'" and 230'" each have asymmetric footprints. The footprint of the shield layer 220'" extends further in cross track direction on one side of the sensor 210. The footprint of the shield layer 230'" extends further in the cross track direction on the opposite side of the sensor 210. Further, the footprints of the shield layers 220'" and 230'" are substantially mirror images of each other. Near the ABS the shield layers 220'" and 230'" are configured to substantially match the read shield 202. In addition, the profile of the shield layers 220'" and 230'" near the ABS have been lengthened. As a result, the shield layers 220'" and 230'" have a larger shape anisotropy near the ABS. In addition, the shield layers 220'" and 230'" each has a cut-out 222 and 232, respectively, in the back edge in the region aligned with the read sensor 210. Thus, the shield layers 220'" and 230'" are thinner near the read sensor 210. However in other embodiments, other configurations are possible.

As can be seen in FIG. 7C, the shield layers 220'" and 230'" overlap in the down track direction. This overlap is shown as cross hatched in FIG. 7. In some embodiments, this overlap is approximately twenty percent or less of the footprint of the shield layer 220'" and approximately twenty percent or less of the footprint of the shield layer 230'". Because the overlap has been reduced over what would be present if the footprints of the shield layers 220'" and 230'" were the same as that of the read shield 202, the capacitive coupling between the shield layers 220'" and 230'" may be reduced. In addition, because of the shape anisotropy of the shield layers 220'" and 230'", issues due to magnetostriction may be reduced or avoided. The benefits of the read transducers 110 and 200'" may thus be achieved while mitigating high frequency issues due to capacitive coupling between the shield layers 220'" and 230'". Cross talk may also be reduced. In addition, the cut out 222 and 232 allow for improved magnetic stability of the shield layers 222'" and 232'". Consequently, performance of the transducer 200'" and disk drive 100 may be improved.

Figure 8:
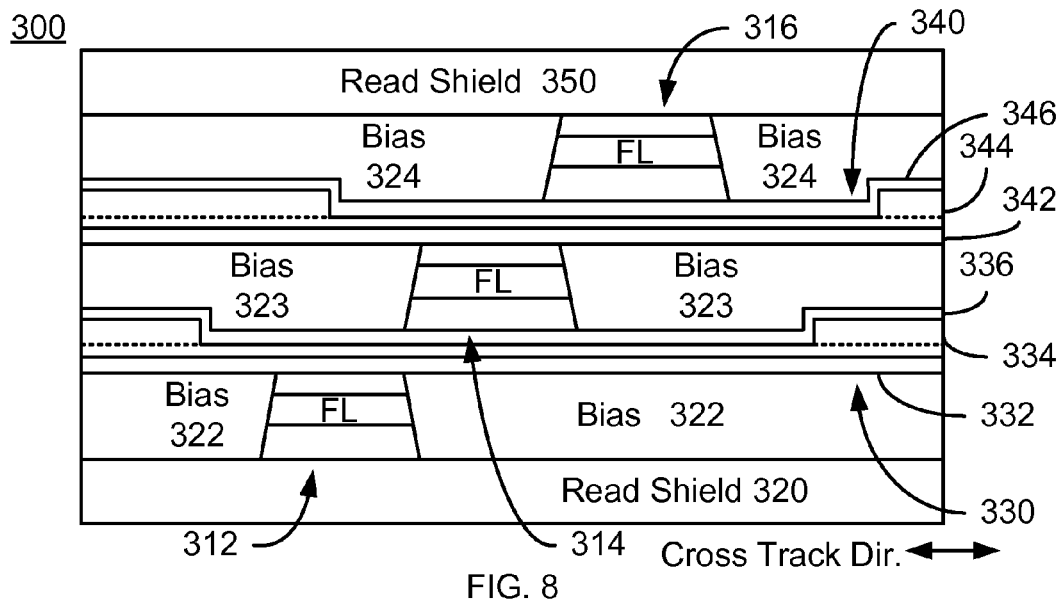
FIG. 8 depicts an ABS view of another exemplary embodiment of a portion of a magnetic recording read transducer.

FIG. 8 depicts an ABS view of another exemplary embodiment of a portion of a magnetic recording read transducer 300. For clarity, FIG. 8 is not to scale. For simplicity, only a portion of the read transducer 300 is shown. The read transducer 300 may be used in the disk drive 100 and is analogous to the read transducer 110. The read transducer 300 includes read shields 320 and 350, read sensors 312, 314 and 316 and magnetic bias structures 322, 323 and 324 that are analogous to the read shields 120 and 150, read sensors 112, 114 and 116 and magnetic bias structures 122, 123 and 124, respectively.

The transducer 300 also includes shields 330 and 340 that are analogous to the shields 130 and 140. The shield 330 thus includes shield layers 332 and 336 separated by insulating layer 334 and which are analogous to the layers 132, 136 and 134, respectively. Similarly, shield 340 includes shield layers 342 and 346 separated by insulating layer 344 and which are analogous to the layers 142, 146 and 144, respectively. The shield layers 132 and 136 and the shield layers 142 and 146 may also be analogous to the shield layers 220 and 230, 220' and 230', 220" and 230" and/or 220'" and 230'", respectively. Thus, the shields 330 and 340 may be configured to have reduced overlap in the down track direction and, therefore, reduced capacitive coupling.

The insulating layers 334 and 344 are also configured to reduce capacitive coupling between the shield layers 332 and 336 and the shield layers 342 and 346, respectively. More specifically, the insulating layer 334 has a varying thickness at a particular distance from the sensors 312 and 314. In some embodiments, this distance is at least five microns from the sensors 312 and 314. In particular, the thickness of the insulating layer 334 increases at a distance from the sensors 312 and 314. In some embodiments, the insulating layer 334 is at least ten nanometers but not more than twenty nanometers thick closer to the read sensors 312 and 314. However, the insulating layer 334 is at least twenty nanometers thick in portions spaced apart from the sensors 312 and 314 by at least five microns. In some embodiments, a different dielectric is used in at least part of the thicker portions of the insulating layer 334. For example, a low dielectric constant material may be used for a sublayer of the insulating layer 334. This is shown by a dotted line in the layer 334. Similarly, the thickness of the insulating layer 344 increases at a distance from the sensors 314 and 316. In some embodiments, the insulating layer 344 is at least ten nanometers but not more than twenty nanometers thick closer to the read sensors 314 and 316. However, the insulating layer 344 is at least twenty nanometers thick in portions spaced apart from the sensors 314 and 316 by at least five microns. In some embodiments, a different dielectric is used in at least part of the thicker portions of the insulating layer 344. For example, a low dielectric constant material may be used for a sublayer of the insulating layer 344. This is shown by a dotted line in the layer 344. In alternate embodiments, the thickness of the layer 334 and/or 344 may remain substantially constant, but the material may change for portions that are a greater distance from the sensors 312, 314 and 316. Although described as being at least five micron, the distance from the sensors 312, 314 and 316 at which the layer(s) 334 and/or 344 thicken or change material may be dependent at least in part upon fabrication conditions.

Because of the increase in thickness and/or change in the dielectric used, the capacitive coupling between the shield layers 332 and 336 and/or between the shield layers 342 and 346 may be reduced. The benefits of the read transducers 110 and 300 may thus be achieved while mitigating high frequency and noise issues due to capacitive coupling between the shield layers 332 and 336 and/or between the shield layers 342 and 346. Consequently, performance of the transducer 300 and disk drive 100 may be improved.

Figure 9:
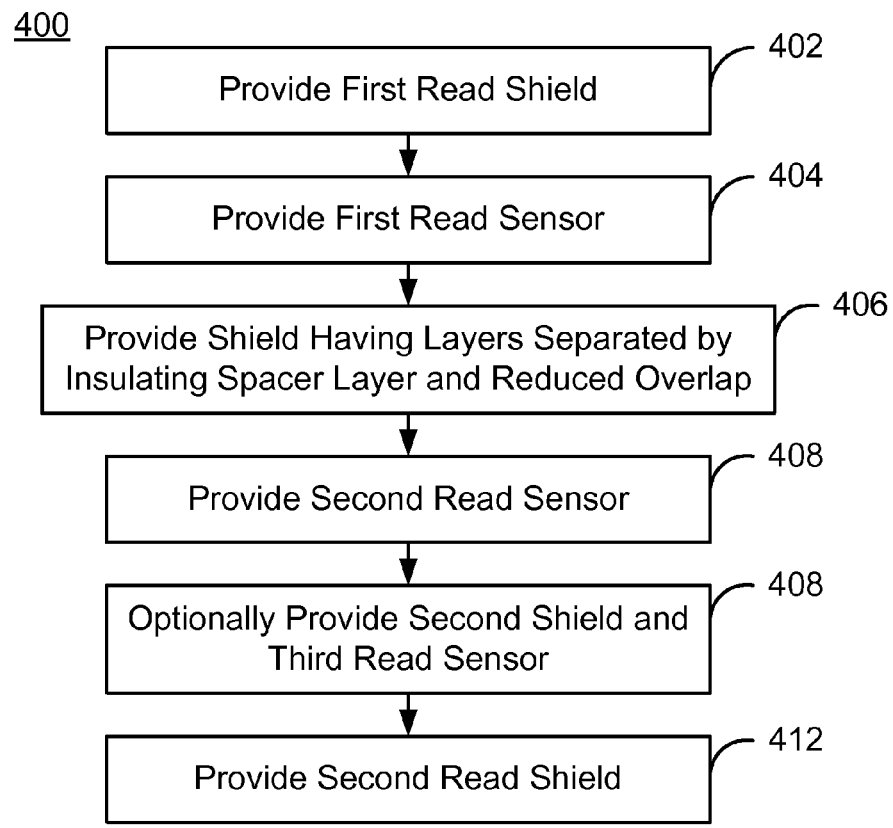
FIG. 9 is a flow chart depicting an exemplary embodiment of a method for fabricating a magnetic recording read transducer.

FIG. 9 is an exemplary embodiment of a method 400 for providing a read transducer having improved capacitive coupling. For simplicity, some steps may be omitted, interleaved, and/or combined. The method 400 is also described in the context of providing a single recording transducer 110 depicted in FIGS. 2-3. However, the method 400 may be used to fabricate multiple transducers at substantially the same time. The method 400 may also be used to fabricate other transducers including but not limited to any combination of the transducer 200, 200', 200", 200''' and/or 300. The method 400 is also described in the context of particular layers. A particular layer may include multiple materials and/or multiple sub-layers. The method 400 also may start after formation of other portions of the magnetic recording transducer.

The first read shield 120 is provided, via step 402. Step 402 typically includes depositing a large high permeability layer. The read sensor 112 is provided, via step 404. Step 404 includes depositing the layers for the sensor 112 and defining the sensor 112 in at least the track width direction using an ion mill. In some embodiments, the free layer 113 and the pinned layer of the sensor 112 is also defined in the stripe height direction. The magnetic bias structures for the sensor 112 may also be provided as part of step 404.

The shield 130 is provided, via step 406. In some embodiments, step 406 includes depositing a soft magnetic material, such as NiFe as the shield layer 132. The shield layer 132 may then be patterned, for example to be analogous to the shield layer(s) 230, 230', 230" and/or 230'''. The insulating layer 134 is also deposited as part of step 406. Step 406 may include patterning or providing multiple sublayers, such as for the shield layer 134.

The read sensor 114 is provided, via step 408. Step 408 includes depositing the layers for the sensor 114 and defining the sensor 114 in at least the track width direction using an ion mill. In some embodiments, the free layer 115 and the pinned layer of the sensor 114 is also defined in the stripe height direction. The magnetic bias structures for the sensor 114 may also be provided.

If sensor 116 is to be used, then the shield 140 and sensor 116 may be provided in a manner analogous to steps 404 and 406, via step 408. If, however, two sensors 112 and 114 are to be used, then the read shield 150 is provided, via step 410.

Step 410 may include forming a shield having ferromagnetic layers which are antiferromagnetically coupled. In other embodiments, other multilayers or a single layer may be formed. Thus, the benefits of the magnetic transducer(s) 110, 200, 200', 200", 200''' and/or 300 may be achieved.

Figure 10:
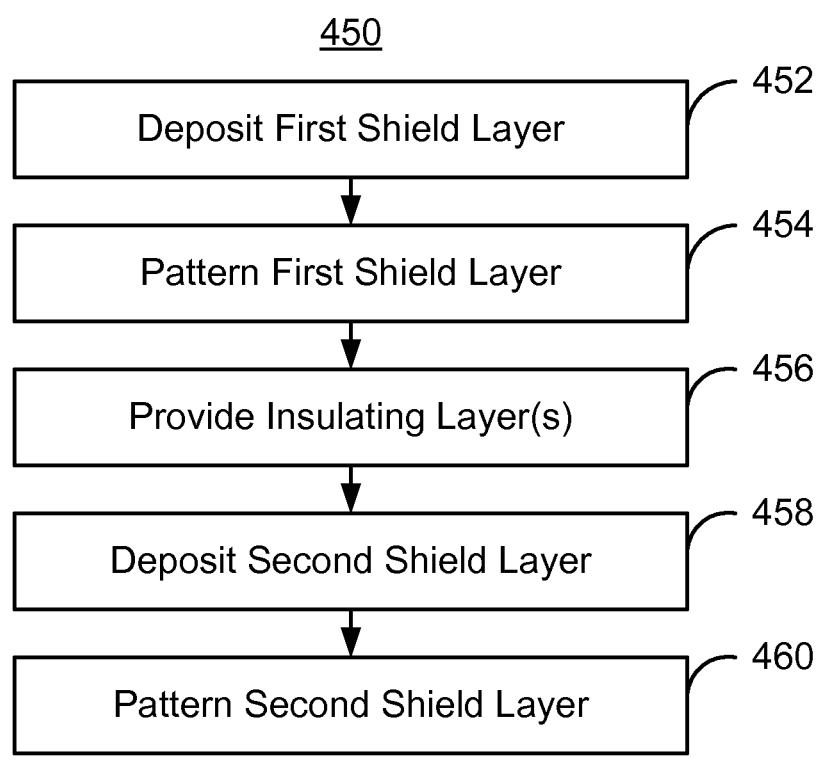
FIG. 10 is a flow chart depicting an exemplary embodiment of a method for fabricating a magnetic recording read transducer.

FIG. 10 is an exemplary embodiment of a method 450 for providing a shield in a read transducer. For simplicity, some steps may be omitted, interleaved, and/or combined. The method 450 is also described in the context of providing a shield 130 for a single recording transducer 110 depicted in FIGS. 2-3. However, the method 450 may be used to fabricate multiple transducers at substantially the same time. The method 450 may also be used to fabricate other transducers including but not limited to any combination of the transducer 200, 200', 200", 200''' and/or 300. The method 450 is also described in the context of particular layers. A particular layer may include multiple materials and/or multiple sub-layers. The method 450 also may start after formation of other portions of the magnetic recording transducer.

The shield layer 132 is provided, via step 452. Step 452 typically includes depositing (e.g. plating) a large high permeability layer. The shield layer 132 is patterned, via step 454. Step 454 may include covering a portion of the shield layer with a mask and removing the remaining portion. Alternatively, steps 452 and 454 may be combined by providing a mask having an aperture in the desired location and footprint of the shield layer 132, then plating the shield layer. Thus, the desired footprint such as that shown in FIGS. 4A-4C, 5A-5C and/or 6A-6C may be provided. The insulating layer 134 is provided, via step 456.

The shield layer 136 is provided, via step 458. Step 458 typically includes depositing (e.g. plating) a large high permeability layer. The shield layer 136 is patterned, via step 460. Step 460 may include covering a portion of the shield layer with a mask and removing the remaining portion. Alternatively, steps 458 and 460 may be combined by providing a mask having an aperture in the desired location and footprint of the shield layer 136, then plating the shield layer. Thus, the desired footprint such as that shown in FIGS. 4A-4C, 5A-5C and/or 6A-6C may be provided. The shield layers 132, 136, 142, 146, 220, 230, 220', 230', 220", 230", 220''', 230''', 332, 336, 342 and 346 may be formed. Thus, the benefits of the magnetic transducer(s) 110, 200, 200', 200", 200''' and/or 300 may be achieved.

We claim:

1. A magnetic read transducer having an air-bearing surface (ABS) and comprising:
   a first read sensor;
   a shield residing in a down track direction from the first read sensor, the shield including a first shield layer, a second shield layer and an insulating layer between the first shield layer and the second shield layer, the first shield layer residing between the first read sensor and the second shield layer, the first shield layer having a first footprint, the second shield layer having a second footprint, the second shield layer overlapping the first shield layer in the down track direction by an overlap, the overlap being not more than fifty percent of the first footprint and not more than fifty percent of the second footprint; and
   a second read sensor, the first shield layer residing between the first read sensor and the second read sensor in the down track direction, the second shield layer being between the first shield layer and the second read sensor.

2. The magnetic read transducer of claim 1 further comprising:

a first read shield; and
a second read shield, the first read sensor, the second read sensor and the shield residing between the first read shield and the second read shield.

3. The magnetic read transducer of claim 1 wherein the overlap is not more than twenty-five percent of the first footprint and not more than twenty-five percent of the second footprint.

4. The magnetic read transducer of claim 1 wherein the overlap is not more than twenty percent of the first footprint and not more than twenty percent of the second footprint.

5. The magnetic read transducer of claim 1 wherein the overlap is not more than fifteen percent of the first footprint and not more than fifteen percent of the second footprint.

6. The magnetic read transducer of claim 1 wherein the first shield layer is substantially a mirror image of the second shield layer such that the shield is substantially symmetric with respect to a location of the second read sensor in a cross track direction.

7. The magnetic read transducer of claim 1 wherein the second read sensor has a first side and a second side opposite to the first side in a cross-track direction and wherein the first shield layer extends further from the first side in the cross-track direction than from the second side and wherein the second shield layer extends further from the second side in the cross-track direction than from the first side.

8. The magnetic read transducer of claim 1 wherein the overlap has a first distance along the ABS and a second distance perpendicular to the ABS, the first distance being greater than the second distance.

9. The magnetic read transducer of claim 1 wherein the insulating layer has a dielectric constant less than a silicon dioxide dielectric constant.

10. The magnetic read transducer of claim 9 wherein insulating layer includes at least one of SiO and SiOC.

11. The magnetic read transducer of claim 1 wherein the insulating layer has a first thickness within a first distance of the first and second read sensors and a second thickness more than a second distance from the first read sensor and second read sensor, the first thickness being less than the second thickness.

12. The magnetic read transducer of claim 11 wherein the first distance is five microns.

13. The magnetic read transducer of claim 11 wherein the first thickness is at least ten nanometers and wherein the second thickness is at least twenty nanometers.

14. A disk drive comprising:
a media;
a slider including a magnetic read transducer having an air-bearing surface (ABS), the magnetic read transducer including a first read sensor, a shield, and a second read sensor, the shield including a first shield layer, a second shield layer and an insulating layer between the first shield layer and the second shield layer, the first shield layer residing between the first read sensor and the second shield layer, the first shield layer having a first footprint, the second shield layer having a second footprint, the second shield layer overlapping the first shield layer in the down track direction by an overlap, the overlap being not more than fifty percent of the first footprint and not more than fifty percent of the second footprint, the second shield layer being between the first shield layer and the second read sensor.

15. A method for providing a magnetic read transducer having an air-bearing surface (ABS), the method comprising:

providing a first read sensor;
providing a shield residing in a down track direction from the first read sensor, the shield including a first shield layer, a second shield layer and an insulating layer between the first shield layer and the second shield layer, the first shield layer residing between the first read sensor and the second shield layer, the first shield layer having a first footprint, the second shield layer having a second footprint, the second shield layer overlapping the first shield layer in the down track direction by an overlap, the overlap being not more than fifty percent of the first footprint and not more than fifty percent of the second footprint; and
providing a second read sensor, the first shield layer residing between the first read sensor and the second read sensor in the down track direction, the second shield layer being between the first shield layer and the second read sensor.

16. The method of claim 15 further comprising:
providing a first read shield; and
providing a second read shield, the first read sensor, the second read sensor and the shield residing between the first read shield and the second read shield.

17. The method of claim 15 wherein the overlap is not more than twenty-five percent of the first footprint and not more than twenty-five percent of the second footprint.

18. The method of claim 15 wherein the overlap is not more than twenty percent of the first footprint and not more than twenty percent of the second footprint.

19. The method of claim 15 wherein the overlap is not more than fifteen percent of the first footprint and not more than fifteen percent of the second footprint.

20. The method of claim 15 wherein the first shield layer is a mirror image of the second shield layer such that the shield is substantially symmetric with respect to a location of the second read sensor in a cross track direction.

21. The method of claim 15 wherein the second read sensor has a first side and a second side opposite to the first side in a cross-track direction and wherein the first shield layer extends further from the first side in the cross-track direction than from the second side and wherein the second shield layer extends further from the second side in the cross-track direction than from the first side.

22. The method of claim 15 wherein the overlap has a first distance along the ABS and a second distance perpendicular to the ABS, the first distance being greater than the second distance.

23. The method of claim 15 wherein the insulating layer has a dielectric constant less than a silicon dioxide dielectric constant.

24. The method of claim 23 wherein insulating layer includes at least one of SiO and SiOC.

25. The method of claim 15 wherein the insulating layer has a first thickness within a first distance of the first and second read sensors and a second thickness more than a second distance from the first read sensor and second read sensor, the first thickness being less than the second thickness.

26. The method of claim 25 wherein the first distance is five microns.

27. The method of claim 25 wherein the first thickness is at least ten nanometers and wherein the second thickness is at least twenty nanometers.

* * * * *